Fig. 4.

TRANSMITTER
TWO IN

RECEIVER
TWO OUT

TANDEM
ONE IN
ONE OUT
ONE THROUGH

REGENERATOR
TWO THROUGH

Oct. 30, 1956  G. T. BAKER  2,769,030
ELECTRICAL SIGNALLING SYSTEMS
Filed Jan. 26, 1951  11 Sheets-Sheet 10

Fig.10.

INVENTOR
George Thomas Baker
BY
ATTORNEY

Oct. 30, 1956     G. T. BAKER     2,769,030
ELECTRICAL SIGNALLING SYSTEMS
Filed Jan. 26, 1951     11 Sheets-Sheet 11

INVENTOR
George Thomas Baker
BY
ATTORNEY

United States Patent Office 2,769,030
Patented Oct. 30, 1956

2,769,030

ELECTRICAL SIGNALLING SYSTEMS

George Thomas Baker, Taplow, England

Application January 26, 1951, Serial No. 207,891

Claims priority, application Great Britain January 30, 1950

14 Claims. (Cl. 178—50)

The present invention relates to electrical signalling systems and is more particularly concerned with the transmission of intelligence by signals in codes of the kind used in telegraphy. The system according to the invention moreover, while capable of operating on a start-stop basis if this should be necessary, is designed for operation on a synchronous basis with independent timing equipment at the terminal points. It is one object of the invention to produce an improved synchronous telegraph system operating on a multiple basis with means for maintaining synchronism so that operation can be effected satisfactorily with independent pulse sources at opposite ends of the line. Another object of the invention is to produce a piece of equipment which with very slight modifications can be used at the transmitting end, at the receiving end or at an intermediate point as a regenerator. Moreover, when operation takes place on a multiple basis the same piece of equipment can operate simultaneously to generate signals from punched tape for one channel, to effect regeneration for another channel and to operate a teleprinter for a further channel. A further object of the invention is to produce a telecommunication system in which all the equipment is of the electronic type so that there are no moving parts with the exception of the pecker bars of the tape reader operating on the punched tape at the transmitter and the teleprinter at the receiving end.

According to one feature of the invention in a synchronous telegraph system a pulse source is arranged to provide pulses at predetermined regular intervals, for instance 10 milliseconds, and transmitting, receiving and regenerating operations take place in accordance with the timing set by the pulses so produced. The source of pulses may be common to a number of signalling channels, either arranged for a number of channels to use the same communicating medium on a time division basis or a number of separate single channel systems. The pulse source preferably comprises a crystal oscillator which may be housed in an oven with suitable temperature control so as to obtain a high degree of frequency stability, the required pulse frequency being obtained by repeated frequency division. The system is preferably such that a synchronising effect is produced by each signal and even if transmission ceases for a comparatively long period, for instance several days, the frequency stability may be such that the loss of synchronism is no more than can be corrected in a simple manner when transmission is resumed.

According to another feature of the invention an electronic correcting arrangement is provided whereby any phase difference between incoming signals and the local pulse source may be eliminated by altering the pulse generation rate by a predetermined amount for the necessary period. This is conveniently done by using a multi-vibrator circuit which is normally unsymmetrical, that is to say the times for the operate and restore actions are unequal. An increase in the multi-vibrator period may be effected by making the two times equal at the higher figure while a decrease may be effected by making the times equal at the lower figure.

According to a further feature of the invention, an electronic queueing or distributing arrangement is provided whereby a number of signals generated or received simultaneously may be transmitted successively. This is preferably effected by the use of a series of toggle circuits which are interconnected so that the restoration of one circuit will effect the operation of the next in the series. Thus a registration represented by the operation of a toggle circuit can be transferred down the series, transfers taking place if necessary from each member of the series to the succeeding one simultaneously.

The invention will be better understood from the following description of a twin-channel system incorporating the various features which is given by way of example and should be taken in conjunction with the accompanying drawings comprising Figs. 1–12.

It will be assumed that the system is designed to operate on a twin-channel basis, that is to say two messages can be transmitted at the same time, the line time being equally divided between them. The code used is the ordinary 7-unit code commonly used in telegraphy, the total time occupied by a character being 150 ms., at a sending speed of 50 bauds. 20 ms. is occupied for each element and the final 10 ms. which is ordinarily available in a 30 ms. stop signal is used for synchronising. The unit periods of 20 ms. are however divided between the two channels so that 10 ms. is available for each. The system can work on a fully regenerative basis in that at approximately the middle point of each signal element a sample is taken for a period of a few microseconds only and in accordance with the result of the sample the mark or space condition as the case may be is maintained for 10 ms.

Figure 1:
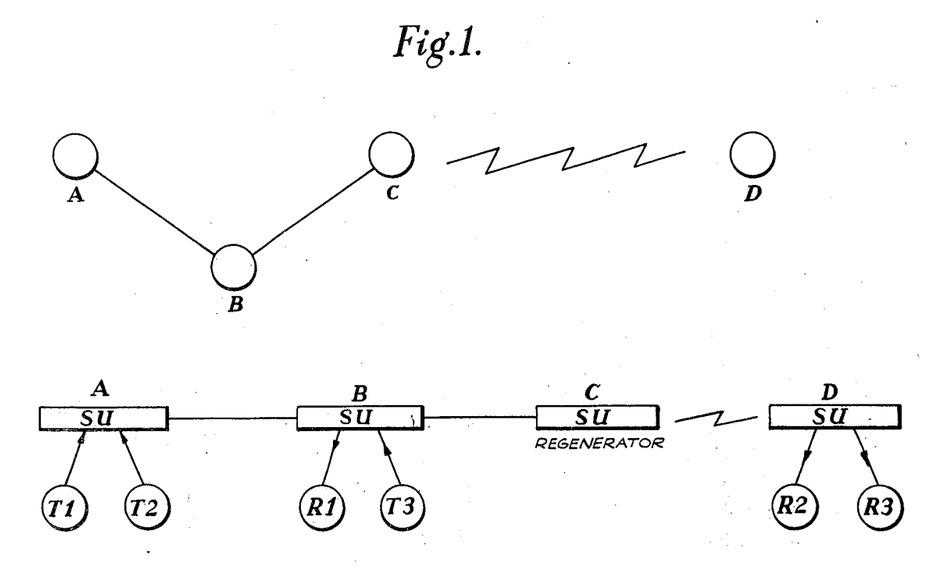
Fig. 1 indicates a typical layout of a group of interconnected stations and a possible way of utilising the equipment, Fig. 2 indicates the general layout of the pulse generating equipment at a signalling point including a variable speed divider and an error detector comprising the means for automatically re-establishing synchronism if it should be lost during a pause in transmission.

Referring first to Fig. 1, this indicates diagrammatically a convenient method of signalling involving four stations A, B, C and D, of which A, B and C are assumed to be comparatively close together and connected by land line or cable, while the distance between C and D is considerable and is spanned by a radio link. In these circumstances it may often be necessary to transmit intelligence from either A or B to D and the arrangement usually employed is to connect A and B with C so as to produce a so-called Y-connection. The arrangements according to the invention enable working to be effected more economically and efficiently if station B is used on a tandem route from A to C and in this case it is readily possible to transmit a message from transmitter T1 at A to receiver R1 at B and at the same time another message from transmitter T2 at A to receiver R2 at D while a further massage can be transmitted from transmitter T3 at B to receiver R3 at D. At station C a regenerating effect is produce and as will be apparent from the subsequent description, the same piece of equipment SU may be employed at stations A, B, C and D though the functions required of it are slightly different in each case. With the arrangements shown, two messages are transmitted over each portion of the signalling link though the messages are not the same for every portion. Obviously there would be no difficulty in arranging for regeneration only at B so that two messages from A were both transmitted to D. Alternatively the set-up could readily be changed so that a transmitter and receiver were operative at C, one message being transmitted only from B to C and another originated at C and transmitted to D.

Figure 2:
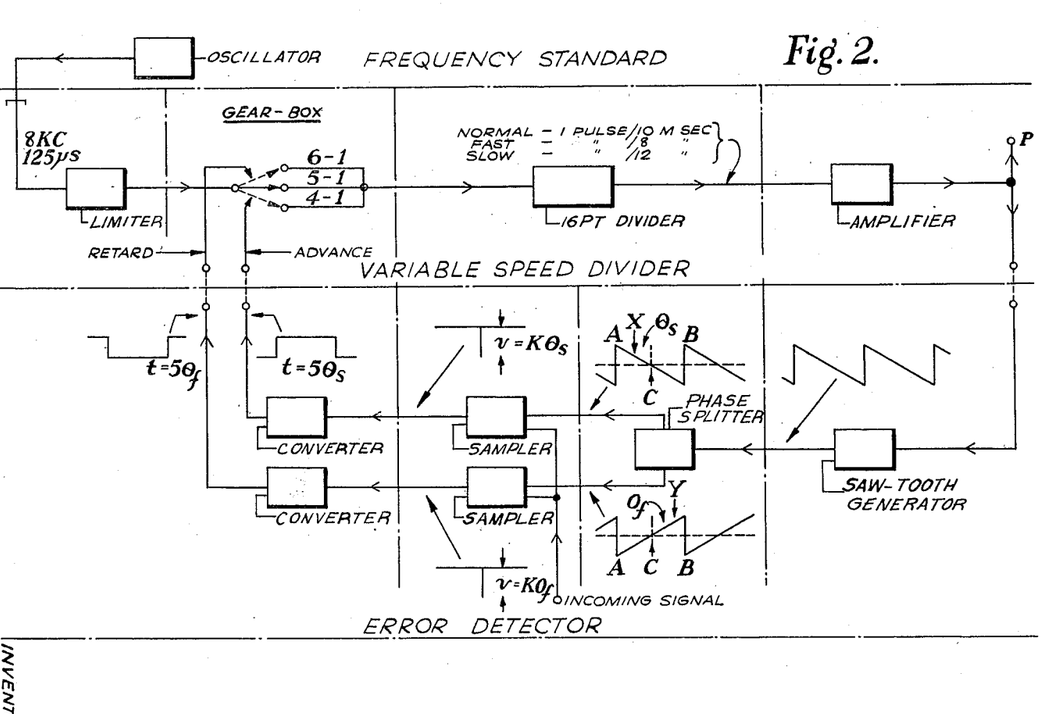

Referring now to Fig. 2, the time scale for a complete exchange is determined by the frequency standard shown at the top. The use of a common frequency source enables considerable accuracy to be maintained with a very small cost to the individual transmitters and receivers. The accuracy is necessary to maintain two interworking stations in alignment during an interruption of the radio link. The type of frequency standard will depend on the expected length of service interruption. Assume that a maximum of 3 ms. drift provides a safe working margin. A free running crystal without temperature control gives an accuracy of about 1 part in $10^4$. The allowable interruption is then about $3 \times 10^4$ ms. or about half a minute. With a comparatively simple form of temperature control 1 part in $10^6$ can be obtained covering an interruption of about one hour. A more precise type of oven gives an accuracy of the order of 1 part in $10^8$ allowing for several days disconnection of service without loss of synchronisation. Such standards are in common use and are comparatively small and inexpensive when considered on an exchange basis. The frequency supplied to the equipment is 8 kc., and since this is low for a convenient crystal, it is assumed that the crystal is run at 40 kc. and is followed by a circuit giving frequency division of one-fifth, as later described in connection with Fig. 2.

The 8 kc. pulses are fed into the variable-speed divider, which is used to control the phase of the receiver relative to an incoming signal. Phase control is obtained by momentarily running the local equipment either faster or slower than the standard frequency. A given amount of phase shift can be effected either by a continuously variable speed operative over a fixed time or by providing a fixed speed change and varying the time over which it is operative. The latter course has been adopted.

The input pulses are taken through a limiter into what may be termed an electronic gear-box which provides for a 20% increase or decrease of speed. A free running multivibrator is synchronised on either 4, 5 or 6 of the incoming pulses. The circuit is symmetrical and control is obtained by varying the potential of the grid charging resistors. With both resistors taken to the full positive potential, each half of the circuit synchronises on two of the locking pulses, giving a 4–1 division ratio. When the potential of one resistor is lowered by a fixed amount, the corresponding charging time is increased by 50% thus requiring three pulses to trip and giving a 5–1 division. When the other side is adjusted in the same way, a 6–1 reduction is produced. By the use of two controls in this manner a simple robust circuit is produced.

The multivibrator output is fed to a four-stage digital divider and an output amplifier so that pulses at 8, 10 or 12 ms. intervals are obtained according to the control on the gear-box. In its normal state, the ratio is 5–1 and as such the circuit can be used for purely transmitting equipments, i. e. where no synchronisation is required. One divider can then supply a large number of distributors or sequence units.

The output of the divider indicates the sampling points on the incoming signal. The error detector exerts suitable controls of the divider such that the changes (i. e. mark-space, space-mark) on the signal fall midway between the sampling points. The sampling pulses are arranged to lock a saw-tooth generator which produces an abrupt change at the sampling point followed by a linear rise to the next flyback. The saw-tooth wave is passed to a phase-splitter i. e. a valve with equal resistances in the anode and cathode circuits whereby one output follows the original saw-tooth and the other is a mirror image about the zero axis.

The two saw-tooth waveforms are used to control the amplitude of positive pulses which are applied to the sampler valves each time a positive change occurs in the incoming signal, the signal being applied to the samplers by way of a differentiating circuit. The upper level of the positive pulses is limited by diodes whose cathodes are supplied with the saw-tooth waveforms, with the result that negative pulses are produced at the sampler anodes of amplitude dependent on the potential of the saw-tooth waveforms at the instant when the signal change occurs. If the signal change occurs at C, Fig. 2, i. e. the correct position, the output pulses from the samplers are of equal amplitude. The circuit is so adjusted that pulses of this or smaller amplitude have no effect on the correcting circuits; thus only the parts of the waveforms above the dotted lines in Fig. 2 are effective.

If the change occurs at X, it indicates that the local sampling pulses are late by an amount $\theta_s$. If the change occurs at Y, i. e. the local pulses are early by $\theta_t$, the "retard" sampler produces a larger impulse, proportional to $\theta_t$, while the "advance" sampler produces only a small pulse. Thus, if the time relationship of the sampling pulses to the incoming signal is correct, as at C, no correction occurs, while if it is incorrect a correction is made in the appropriate direction.

The output from the samplers is taken to two converters in the form of single-shot multivibrators which convert the error pulse into a time interval. The tripped time of the multivibrators depends on an RC circuit working on a comparatively linear part of the characteristic. Hence the time depends on the starting potential, which is derived from the anode of the sampler valve. Accordingly the converters provide a time period which is proportional to the phase error and the constants of the circuit are so chosen that the tripped interval is just five times the phase error.

The converters directly control the gear-box which is caused to depart from the normal 5–1 ratio to either 4–1 or 6–1 depending on whether it is desired to advance or retard the phase of the local signal. Since the alternation of speed is 20% and the time of correction is five times the error, the result of any signal is to correct exactly any phase error existing at the instant of arrival of the signal.

It will be appreciated that though the phase error is a time displacement, this cannot be used directly for effecting correction and some form of corresponding control must be used. It is a convenient and efficient arrangement to obtain a voltage proportional to the phase error and use this to control the time during which correction is applied. It will be noted that this arrangement gives the full correction in response to a single operation of the error detector and does not merely continue to apply correction as long as any error persists.

It will be appreciated that the above description refers to complete correction, i. e. all errors are immediately corrected. It might often be an advantage to make the correction considerably less than the measured error. In this case, the system is less responsive to random changes and becomes of an integrative nature, i. e. a number of errors in the same direction are necessary to ensure 100% correction. The required modification can be introduced very simply by reducing the time constants of the converter multivibrators.

Figure 3:
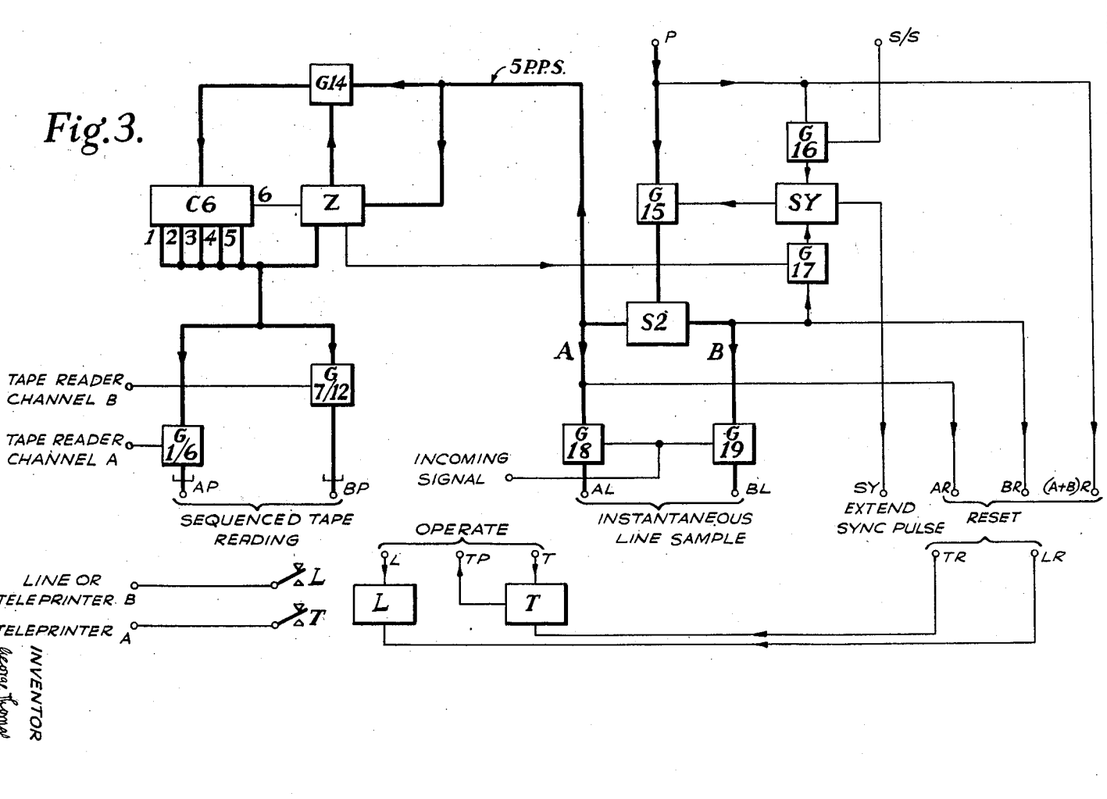
Fig. 3 shows the general lay-out of the so-called sequence unit.

Dealing now with the general principles of the sequences unit shown in Fig. 3, Z, SY, L and T are electronic locking relays each comprising a double triode valve with the anodes and grids cross-connected in the well-known toggle manner to give two stable conditions. A set or operate pulse applied to one grid moves the relay into the set or operated condition and a reset pulse applied to the other grid causes the relay to release. Z, L and T have polarised electro-mechanical relays in the anodes to reproduce on a change-over combination the condition of the electronic portion of the relay. These changeover contacts are shown in Fig. 3 for relays L and T but those for relay Z which are carried by auxiliary relays RX and RY and are used for controlling one of the mechanical operations of the teleprinter are not shown.

S2 is a scale-of-two circuit which also comprises a double-triode connected toggle fashion. The input pulses are applied to both grids simultaneously and the effect of a series of pulses is to move the toggle alternately from one condition to the other.

C6 consists of three double-triodes interconnected to form a six-point cyclic counter. A train of six input pulses causes the counter to move successively through six stable conditions. As a result of the change of the counter from one condition to the next a pulse is transmitted on each of five output wires in sequence, the remaining change not being utilized to obtain a pulse.

The various small squares having references prefixed by G each indicate a rectifier element gate circuit of known type, fuller details of which will be given subsequently.

Figure 5:
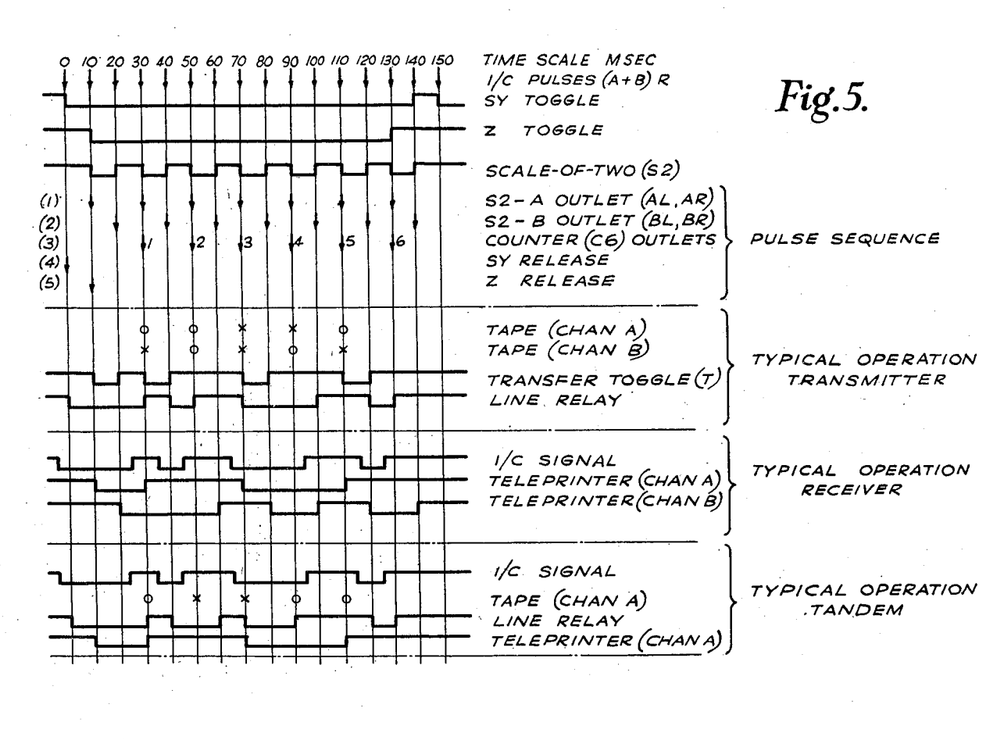
Fig. 5 is a time sequence diagram indicating the sequence of operations under different conditions of use.

The operation is continuous and cyclic, so an arbitrary point must be chosen to commence the description. In the time scale at the top of Fig. 5, zero corresponds to the beginning of the synchronising pulse. Relays SY and Z are operated, the former disconnecting the input S2 at G15. The only effect therefore of the first pulse is to release SY through open gate G16. The release of the relay extends a pulse to the SY terminal as marked by an arrow on line (4), and since G15 is now open, the next input pulse transposes S2, extending a pulse over the A outlet. Relay Z is released but the counter C6 is blocked during th operation of Z by gate G14. The A outlet and Z releases pulses are shown on lines (1) and (5) respectively of the pulse sequence diagram.

The next input pulse trips S2 into the original position, providing a B outlet pulse as shown in line (2). SY is prevented from operating over this circuit as the release of Z closed gate G17. The next pulse is delivered from S2 on the A side and passes through G14 which was opened on the release of Z to step C6 to its second position, at the same time delivering a pulse on the first counter outlet wire. The position of the pulse in the time scale is shown marked "1" on line (3). The action on succeeding pulses is similar, each pair of pulses completing one cycle of S2. The first of each pair provides an A pulse, stepping C6 through to succeeding positions, the second providing a B pulse. The sixth pulse from C6 re-operates Z which closes G14 and opens G17. The next B pulse therefore re-operates SY and the condition is similar to that at the commencement of the description, i. e. SY and Z relays operated, C6 in its normal position. It will be noted that the complete cycle takes 150 ms. i. e. 7½ units on 50 bauds transmission. The pulse sequence shown can be caused by gating and switching to provide all the facilities required from the sequence unit.

The Z release pulse wire and the first five outlets of the counter are combined to form a set of six wires which transmit pulses successively at 20 ms. intervals. The incidence of the pulses in the time scale corresponds to the beginning of the start and the five character elements of a normal single-channel transmission. Each wire is taken to a pair of gates. The first of each pair, i. e. G1/6 correspond to the first or A channel, while the second set, i.e. G7/12 correspond to the B channel. Considering one set of six, the first gate is controlled by the tape controlled by the tape contact, the other five, taken in sequence, by the pecker bars of the tape reader. The outlets of the six gates are commoned and connected to terminal AP. When a tape is inserted in the reader, a group of pulses appears on AP; each pulse indicates that a space condition is required at that point in the transmission. G7/12 provides a similar indication on terminal BP for the second tape reader. It should be noted that at this point the pulses corresponding to channels A and B appear simultaneously and are not yet suitable for duplex transmission.

The A and B outlets of S2 are connected to gates G18 and G19 respectively. These gates are controlled by the incoming line relay, so terminal AL registers the instantaneous line condition at the time of incidence of the A pulse. If the line relay is in a space condition at the moment of taking the sample and hence the gate G18 is open, a pulse appears on AL. Terminal BL reproduces the line condition at the instant of taking the B sample in a similar manner.

The terminals described above control the output relays L and T in such a manner as to move the relays into a space position on the receipt of a pulse. Two other operate or space-producing pulses are required. One, on terminal SY, is derived from the release of the SY relay. The other, on terminal TP, is obtained when the transfer toggle T is released, i. e. returned to the mark condition. A set of reset pulses are available on terminals AR, BR and (A+B)R. These tend to move relays L and T into the mark condition. Operate pulses are of greater amplitude and time duration than their reset equivalents and hence if both are applied simultaneously the former take control. If an operate pulse is received, the output relay is held in the space condition until the next sample or test, whereupon it will automatically be returned to the normal or mark condition by the reset pulse unless a further operate pulse is received, causing the space condition to be retained during the next element.

The operative terminals described above are taken through a wafer or similar switch which provides the appropriate interconnections to enable the same unit to function as a transmitter, receiver, tandem, regenerator and in a number of other circumstances. Typical sets of connections are shown dotted on Fig. 4. The operation is most easily explained by describing specific examples and these will be dealt with in turn.

Figure 4:
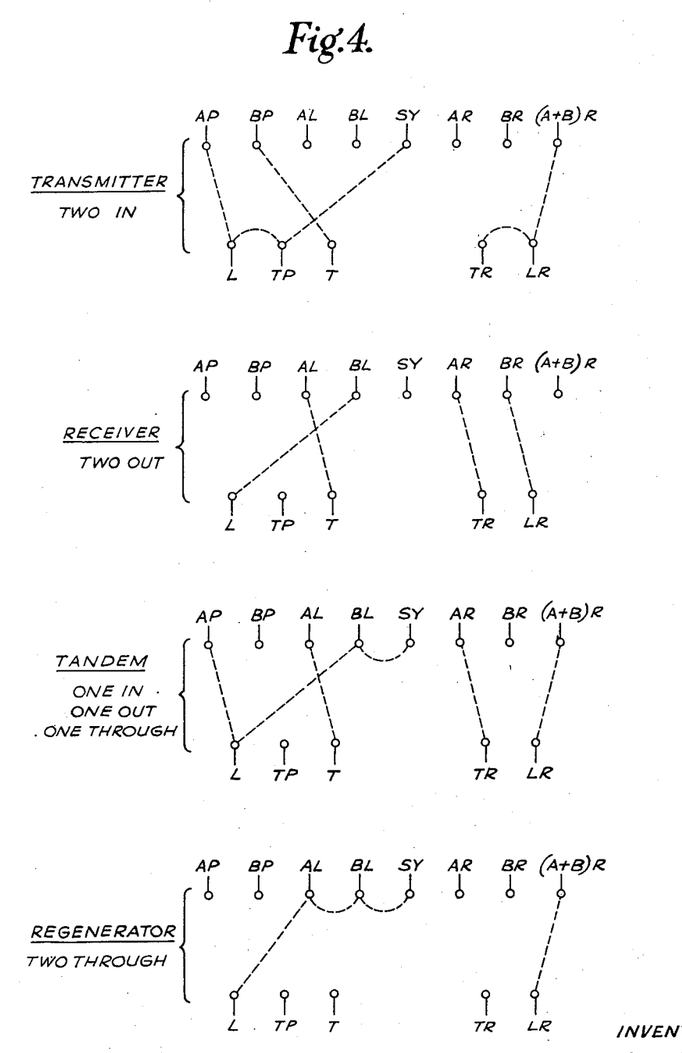
Fig. 4 shows how a number of alternative connections would be made, for instance by means of a multi-position switch, to enable the sequence unit to operate in different circumstances to perform different functions.

For twin-channel transmitting operation corresponding to the conditions at station A in Fig. 1, the connections completed by the switch are as shown in the upper portion of Fig. 4. It will be assumed that a message is in each of the tape readers and that the holes in the tapes are as indicated in the appropriate part of Fig. 5. At the point 0 on the time scale, the SY pulse is received. Since this is a two-channel transmission, a line synchronising pulse is required, so SY is strapped to L and accordingly the relay L is moved to the space condition. At 10, the next reset pulse attempts to restore the relay L but since the tape contact of the first reader is closed, a pulse is received from the Z toggle through gate G1 to terminal AP. This is connected to L so this relay remains in the space position, transmitting the start signal for channel A.

Simultaneously, the Z release pulse passes through G7 which has been opened by the tape contact of the second reader to terminal BP. This operates T and has no immediate effect on L. At 20, a reset pulse is applied to both L and T. The latter resets, but in doing so applies an operate pulse to TP, and since this is connected to L, the line relay is held in a space condition. Thus the next 10 ms. signal transmits the start signal for channel B.

At 30, the first output pulse is extended from counter C6. The blank in the first tape has closed G2 so that no pulse is received on AP and the line relay L is restored to the normal or mark condition by the reset pulse simultaneously applied to LR. The second tape is holding open G8 so relay T is operated through terminal BP. The next reset pulse has no effect on L which is already normal but restores T to operate L through TP. Thus the first half of the 20 ms. signal is mark corresponding to channel A, and the second half space corresponding to the tape registration for channel B.

At 50 the second hole in each tape is scanned and the gates concerned, i. e. G3, G9 are closed by holes in the tape. Both relays L and T are in the mark condition and hence remain so until the next pulse is received from the counter at 70. Gates G4, G10 are both open and relays L and T operate. The reset pulse at 80 transfers the condition of the T relay via TP to relay L and thus space conditions are extended on both channels. Other elements can be followed in the same manner. It will be seen that the condition of the first tape is transmitted immediately to line for the first 10 ms. of an element while the signal from the second tape is temporarily stored on T and is then transferred to line for the second 10 ms of the signal. This device enables the same cyclic counter and Z relay to be used for both channels, although the required outputs are 10 ms. out of phase. The same principle is obviously applicable to a number of channels greater than two.

For twin channel receiving operation corresponding to the conditions at station D in Fig. 1, the switch is turned to the position in which it completes the second set of connections shown on Fig. 4. The synchronising pulse is not required on the teleprinters, so the SY terminal is disconnected. The synchroniser maintains the time cycle 5 ms. lagging behind that of the received signal. To avoid redrawing the pulse sequence, the incoming signal has been advanced 5 ms. As a typical input, the signal generated during the transmitter description is assumed to be received.

No action takes place at the point 0 of the time cycle, i. e. in response to the synchronising pulse. 10 ms. later the first A test is made. The line relay is in the space position allowing the sampling pulse to pass through open gate G18 and terminal AL to relay T, which is moved to the space position and thereby extends the start condition to teleprinter A.

After a further 10 ms. a test is made into the B half of the incoming signal. The line relay still indicates space, so a pulse is extended through gate G19 and the BL terminal to operate L. The space signal is extended to commence a cycle on the second teleprinter. It will be noted that the B test and reset have no effect on the A channel output and vice versa.

At 30 on the time scale, the next A test is made. The line relay now indicates mark and gate G18 is closed, so the reset pulse on the AR terminal resets T to the mark condition, corresponding to the first hole shown in the tape. The B test follows after 10 ms. finds the line relay at space and maintains relay L accordingly. In a similar manner alternate tests are made on the line condition and transferred to the output relays accordingly. All the signals to the teleprinters are completely regenerated and 20 ms. in length.

For tandem operation corresponding to the conditions at station B in Fig. 1, the switch is set to a position which completes the third group of connections on Fig. 4. The B channel message is regenerated and extended, whilst the A channel message is used to actuate a teleprinter and is replaced by a further transmission originating on a local tape reader.

The test on the A section of the incoming signal is carried out exactly as above described and controls T relay to provide the output to the teleprinter. The A portion of the outgoing signal is derived from the tape reader via terminal AP as described above for the twin transmitting operation. Terminal LR is connected to the (A+B)R or 10 ms. reset terminal so that the tape reader thus controls only the first half of the outgoing signal.

The second 10 ms. is provided by the sampling in the second half of the incoming line signal via terminal BL. The signal is thus regenerated and passed to line as received.

For straightforward regeneration on both channels corresponding to the conditions at station C in Fig. 1, the switch is turned so as to give the connections shown in the lowermost group in Fig. 4. From what has been said already it will be clear that the signal pulses from terminals AL and BL serve to operate line relay L in turn, reset pulses being received at 10 ms. intervals due to the connection between terminals (A+B)R and LR.

In the upper right part of Fig. 3 is a terminal marked S/S, not yet discussed. Its purpose is to provide automatic alignment of the receiving equipment and also for temporary start-stop working. For normal synchronous operation, S/S is disconnected and gate G16 which is controlled therefrom is permanently open. For effecting alignment, S/S is temporarily switched to the incoming line relay in the same manner as G18 and G19, for instance by operating a suitable key. During the absence of a message, the transmitting terminal is extending synchronising pulses only, i. e. these are the only breaks on the incoming line relay. At whatever part of the cycle relay SY is operated, it will remain locked until the next synchronising pulse is received. At this point gate G16 is opened and SY reset on the next pulse. The equipment is now in alignment and the temporary connection between S/S and the line relay can be removed.

The facility can be used to provide an automatic check on alignment. The SY terminal is connected via a gate to a slow release relay. As long as the SY reset pulse occurs during the correct part of the cycle, the line relay is in the space condition (i. e. during the synchronising pulse) and the gate is open. The SY pulse holds the slow-to-release relay in an operated condition, but should the equipment drop out of alignment or should the incoming signal be interrupted, the holding pulse to the slow relay ceases and an alarm is given.

For start-stop transmission, which can be single channel only, the S/S terminal is placed under control of the sending equipment e. g. a manual key-board, at the transmitting terminal and under control of the line relay at the receiving terminal and tandem station. When a key is depressed, a momentary break is given on S/S and the transmitter makes a single character cycle. The time between the depression of the key and the commencement of the cycle is never greater than 10 ms. The accuracy provided by the crystal time standard is sufficient to hold the synchronism for a considerable time in the absence of a signal. Since all signals including start-stop characters are used to synchronise, the interstation synchronism is maintained during start-stop transmission. When the circuit is returned to fully synchronous working, the cycle is automatically re-aligned due to the S/S connection at the receiving terminal.

Figure 6:
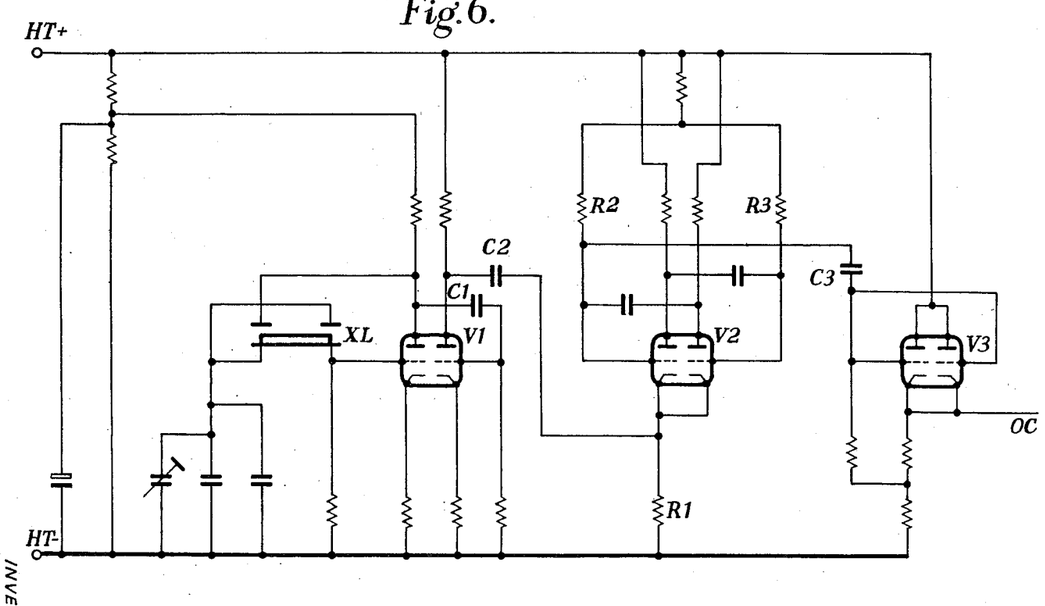
Fig. 6 is a circuit diagram of a crystal-controlled oscillator with a suitable frequency-dividing arrangement to give an output at 8 kc.

The detailed circuits shown in Figs. 6–12 will now be briefly dealt with. Fig. 6 shows the stabilised oscillator circuit and makes use of a crystal XL which in conjunction with the left-hand half of the double triode V1 and the resistors and capacitors shown produces oscillations of 40 kc. The left-hand anode of V1 is connected to the right-hand grid by way of capacitor C1 so that the right-hand half of valve V1 acts as an amplifier of the oscillations and they are fed from the anode of this triode by way of capacitor C2 to the cathode of the double triode V2 which is provided with the common cathode resistor R1. This valve is connected in known manner as a multivibrator and resistor R3 is greater than R2 so that the multivibrator synchronises on two pulses in one direction and on three pulses in the other direction. Accordingly oscillations at a standard frequency of 8 kc. are fed from the left-hand grid of valve V2 by way of capacitor C3 to the grids of the double triode V3 which is arranged as an amplifier of the cathode follower type with its two halves in parallel. The output from the cathodes of V3 extends over lead OC to the left-hand grid of the double triode V4, Fig. 7.

Figure 7:
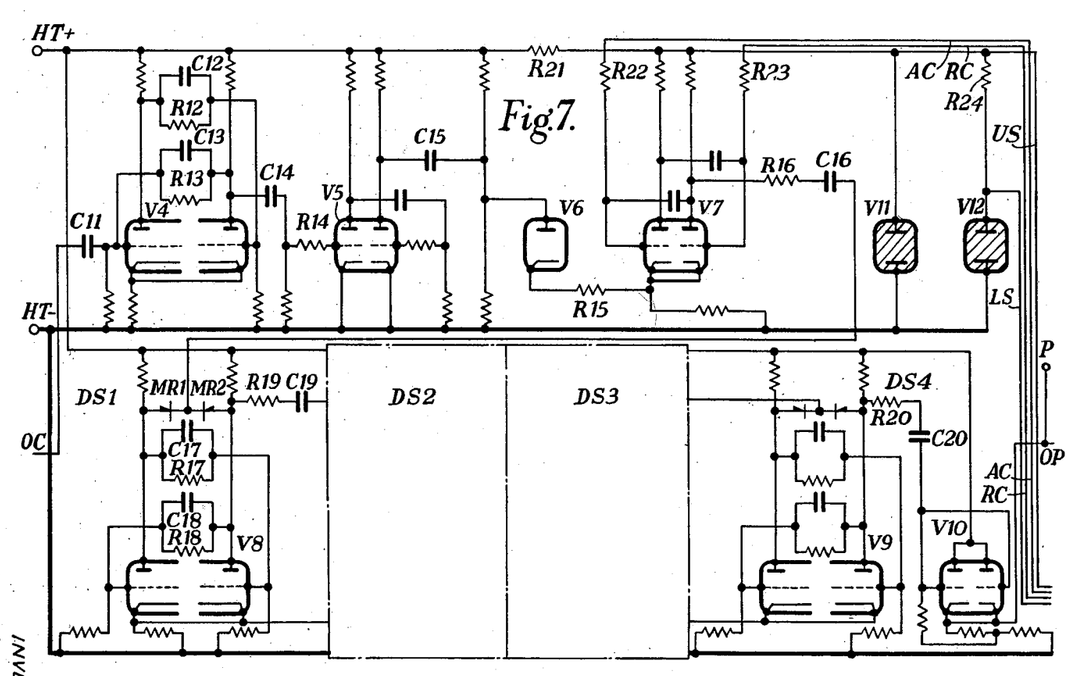
Fig. 7 shows the detailed circuits of the variable speed divider which includes a four-stage digital divider with a normal output of 100 P. P. S.

Valve V4 which is also of the double triode type has capacitor C12 and resistor R12 and capacitor C13 and resistor R13 forming parallel timing circuits connecting the anodes with the opposite grids and this forms a stabilising and limiting stage. The output from the right-hand anode is fed by way of capacitor C14 and resistor R14 to the left-hand grid of double-triode valve V5. Both halves of this valve operate as limiting amplifiers and the output from the right-hand anode is differentiated by capacitor C15 and the resistor network to produce alternate positive and negative pulses, which are applied to the anode of diode V6. This passes the positive pulses only by way of resistor R15 to the cathodes of valve V7 connected as a multivibrator. The pulses synchronise V7 in a manner which can be altered by potentials applied to the grid charging resistors R22 and R23 over leads AC and RC from the error detector as will be more fully described shortly.

The output from the right-hand anode extends by way of resistor R16 and capacitor C16 to the first frequency dividing stage DS1. This consists of valve V8 having timing circuits consisting of capacitor C17 and resistor R17 and capacitor C18 and resistor R18 respectively connecting the anodes to the opposite grids. The input is taken to the junction of the oppositely connected rectifiers MR1 and MR2 which are connected in series between the anodes. The output now normally at 800 cycles, is taken from the right-hand anode and passes by way of resistor R19 and capacitor C19 to the two further dividing stages DS2 and DS3 which are similar in all respects to that constituted by the valve V8 and its associated components and are therefore only indicated. A further dividing stage DS4 consisting of valve V9 and associated components connected similarly to the preceding stages gives an output by way of resistor R20 and capacitor C20 to the grids of the double triode valve V10 which is connected as a cathode follower amplifier and provides a suitable square wave output which in the normal case will be at 100 P. P. S. over lead OP and to terminal P.

The tube V11, which is a gas discharge tube, ensures that the voltage on lead US shall be stabilised and in consequence of the inclusion of the resistor R21 in the feed from HT+ the value of this voltage may conveniently be 150 volts. The gas discharge tube V12 is connected in series with resistor R24 between the lead US and HT— and consequently a stabilised voltage, conveniently of about 95 volts, appears on the lead LS. It will be appreciated that the anode voltage for the operation of the multivibrator formed by the valve V7 is also obtained from the lead US.

The 100 C. P. S. square wave is therefore fed over lead OP to the error detector of Fig. 8, this waveform being differentiated by capacitor C31 and the resistor network and applied as alternate positive and negative pulses to the left-hand cathode of valve V13, which operates as a saw tooth generator and phase splitter. When a negative pulse appears (every 10 m. secs.) at this cathode, the left-hand half of V13 conducts, cutting off the right-hand half by reason of the direct connection from the left-hand anode to the right-hand grid. For the remainder of the cycle the left-hand half of V13 returns to its non-conducting state, while the current in the right-hand half increases linearly as a result of the resistance condenser network in its grid and cathode circuits. This linear rise continues until another negative pulse triggers the circuit back to its starting point.

Figure 8:
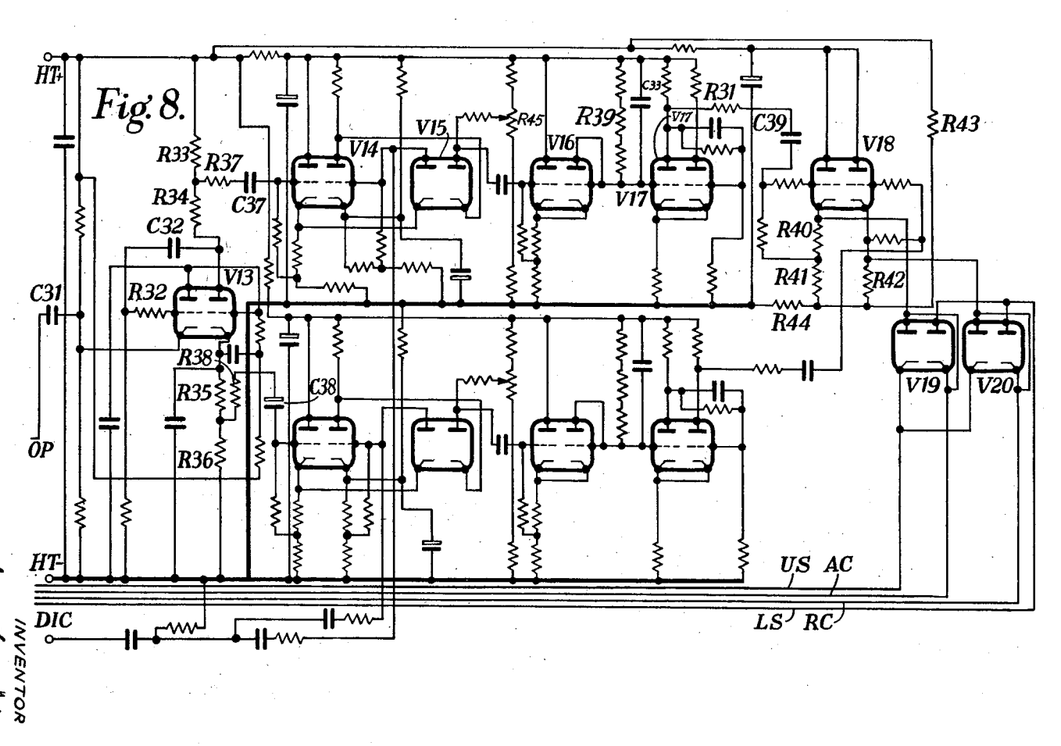
Fig. 8 is a circuit diagram of the error detector which controls the operation of the variable speed divider in accordance with incoming signals.

Since the right-hand portion of V13 has equal resistors in its anode and cathode circuits, the outputs which are taken by way of resistor R37 and capacitor C37 and resistor R38 and capacitor C38 consist of sawtooth waveforms which are equal in magnitude but opposite in phase, that is to say, one output forms a mirror image of the other. The sawtooth wave is negative-going at the anode and positive-going at the cathode.

What may be termed the advance and retard portions of the circuit are precisely similar and consequently only the upper or advance portion will be described in detail.

The sawtooth waveform is applied to the left-hand grid of valve V14 which acts as a cathode follower. Its cathode is connected to the cathode of the left-hand diode of V15. The anode of this diode is connected to the right-hand grid of V14, and thus the potential of this grid is prevented from rising above that on the cathode of the cathode follower, since the diode would conduct to prevent an increase in potential above this level. The right-hand grid of V14 also has connected to it a differentiating circuit from terminal DIC at which the incoming signal appears. Thus a positive pulse appears at this grid whenever a positive-going signal change occurs.

The output from V14 will consist of a negative pulse, but the amplitude of the pulse will depend on the time relationship between the incoming signal change and the local sampling pulses which generate the sawtooth. If the signal change occurs at the bottom of the sawtooth, the left-hand diode of V15 prevents the grid potential of V14 rising appreciably on receipt of the positive pulse via DIC, and the anode output is very small.

If however, the signal change occurs at the top of the sawtooth, the grid of V14 is allowed to rise to a higher potential, and a large output is obtained at the anode. Thus V14 in effect compares the timing of the signal change and the local sampling pulse, and generates a negative voltage pulse of amplitude proportional to the time (or phase) difference.

This negative pulse is applied to the left-hand grid of V16, connected as a cathode follower, through the right-hand diode V15 which can be adjusted by means of the adjustment on resistor R45 to reduce the pulse amplitude until the following converter circuit operates correctly.

The negative pulse output from the left-hand cathode of V16 is connected through the right-hand side of V16 (strapped as a diode) to the left-hand grid of V17, which is arranged as a single-shot multivibrator. Normally, due to the high resistance R39 between the left-hand grid and HT+, the left-hand half of V17 is conducting and the right-hand half is non-conducting. The negative pulse applied to the left-hand grid, if of sufficient amplitude, charges the grid capacitor C33 and reverses the condition of the circuit, the left-hand half being then cut off and the right-hand half being caused to conduct. On cessation of the pulse, the capacitor C33 commences to discharge, and when the grid potential rises to the point where conduction begins, the circuit triggers back to its normal condition. The time required for this to take place depends on the amplitude of the negative pulse; the larger the pulse, the longer the delay. It is also controlled by the time constant of the left-hand grid circuit of V17, i. e. the product of R39 and C33. The slider on resistor R45 is adjusted so that the pulse amplitude produced by a signal changeover in the centre of the sawtooth waveform (i. e. the correct position) is just insufficient to trigger V17; if the changeover occurs during the more positive half of the sawtooth, V17 is triggered for a time proportional to the error in timing. A changeover during the lower half of the sawtooth will not trigger V17 but will trigger the corresponding valve in the "retard" circuit, since the sawtooth fed to this circuit is inverted.

When V17 is triggered, a positive-going square pulse is connected from its left-hand anode through resistor R31 and capacitor C39 to the left-hand grid of V18, connected as a cathode follower and biased in such a way that its cathode potential would normally be below 95 volts rising to above 150 volts during the output pulse from V17. The right-hand half of V18 is also a cathode follower, biased so that its cathode potential would normally be more than 150 volts, falling to below 95 volts on receipt of a negative-going pulse output from the singe-shot multivibrator on the "retard" circuit. The double diodes V19 and V20, which are supplied with 95 and 150 volts from stabiliser valves V12 and V11, as already described, act as voltage clamps, and hold the cathode voltages of the valve V18 between 95 and 150 volts.

The cathodes of V18 are connected via leads AC and RC to the grid resistors R22 and R23 of valve V7, Fig. 7. AC is normally at 95 volts and RC at 150 volts, in which condition the multivibrator V7 divides by 5, synchronising on three input pulses in one half cycle and on two in the other half cycle. When the error detector detects an error requiring the advancing of the local pulses, the potential of lead AC is raised to 150 volts for a time proportional to the error, and V7 then synchronises on 2 pulses in each half-cycle, thereby increasing in speed for the duration of the converter output signal. On the other hand, if a retarding signal is applied to lead RC, reducing its potential to 95 volts, V7 synchronises on 3 pulses in each half cycle, and the speed is reduced.

The short-term change in speed which is produced by an error signal alters the time relationship of the 100 C. P. S. square wave which drives the sawtooth generator in such a way that the sawtooth moves relative to incoming signal changes so that the changes occur at the centre of the sawtooth. In this condition, the signal elements are sampled in the centre and correct reception is achieved.

Figure 9:
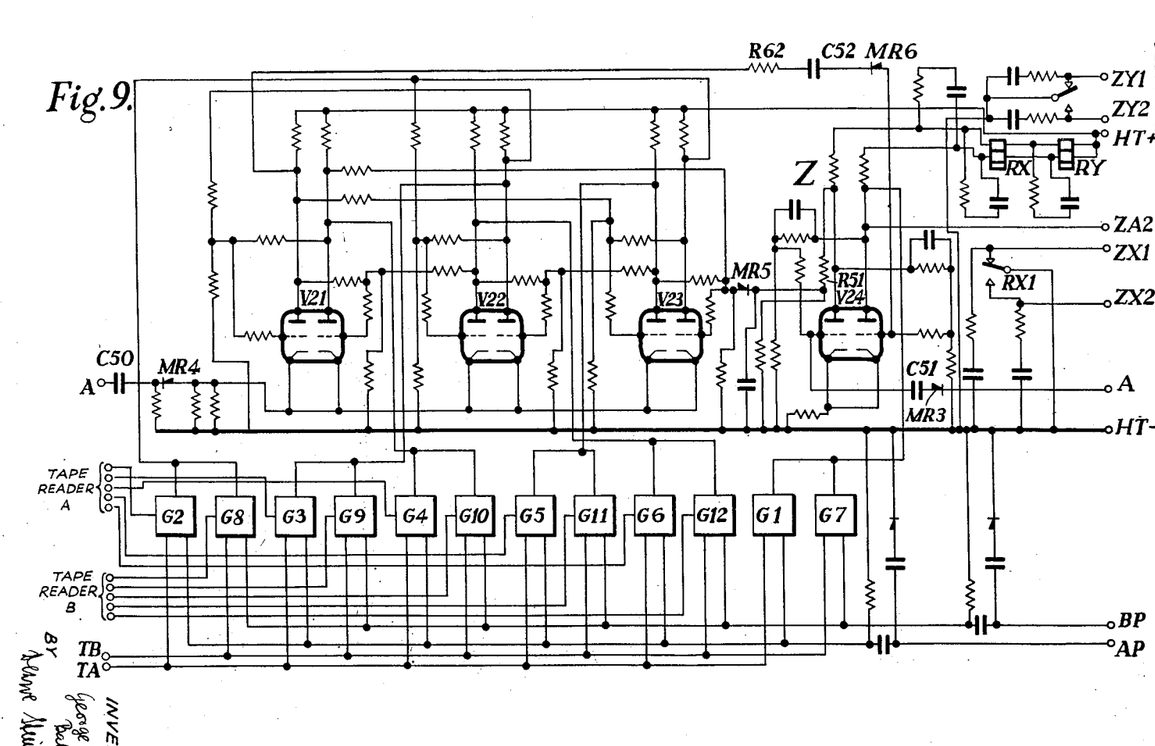
Figs. 9–11 show details of different portions of the sequence unit and Fig. 12 shows details of the gate circuits G1—G12 in Fig. 9.
Figure 10:
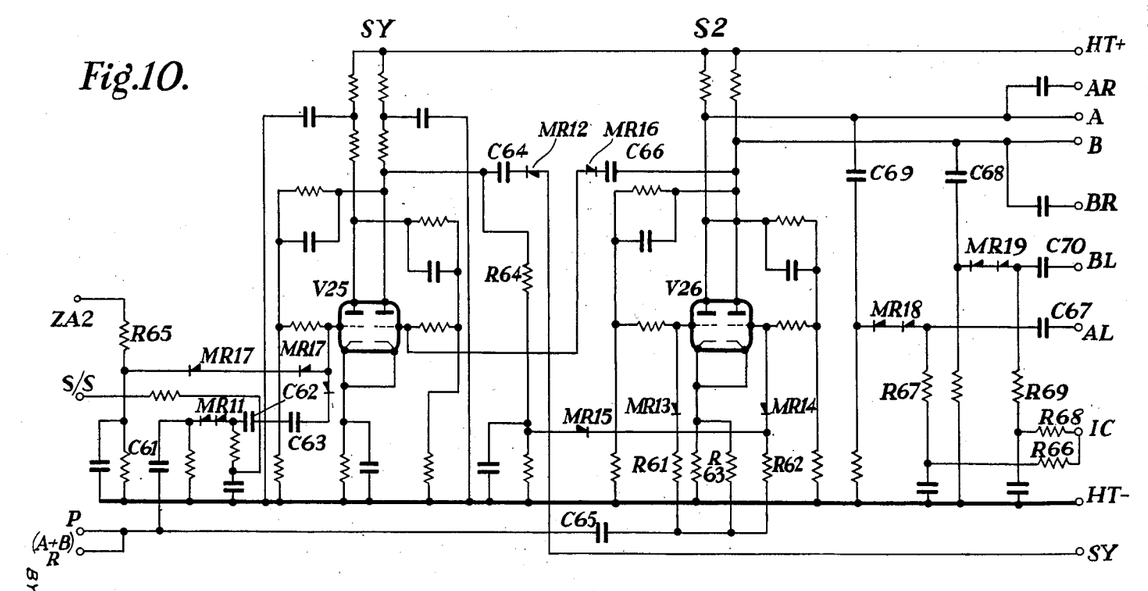
Figures 11, 12:
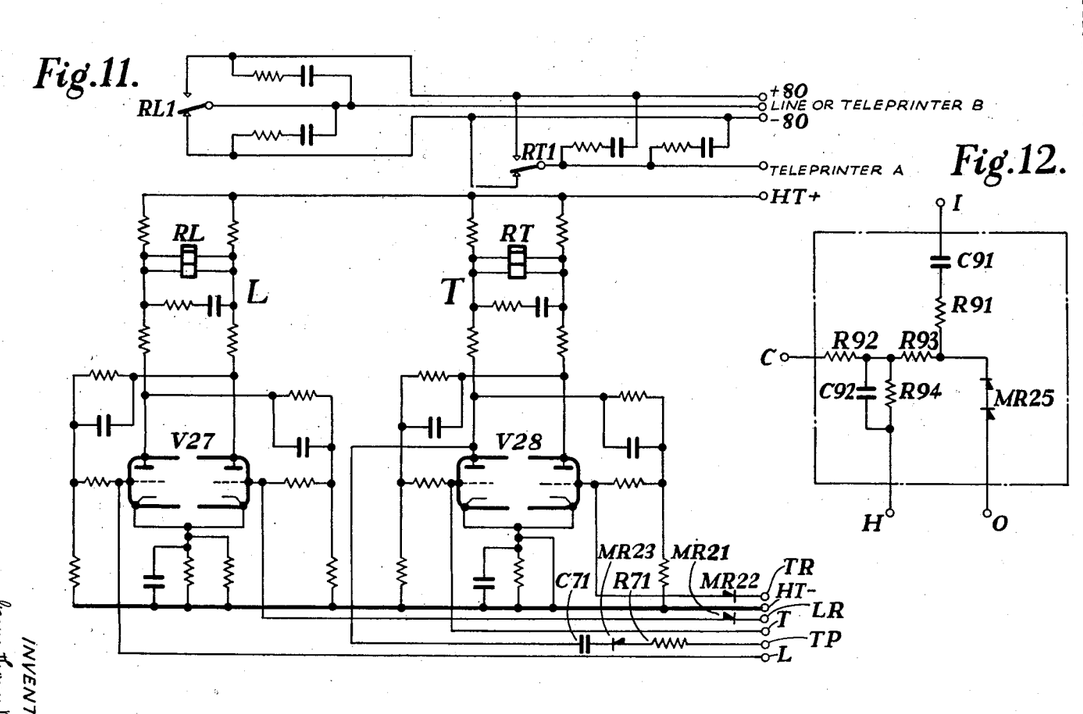

Considering now the operation of the sequence unit shown in Figs. 9, 10 and 11, and particularly Fig. 10, the phase-corrected pulses are applied to the terminal P and extend by way of capacitor C61 and rectifiers MR11 and capacitors C62 and C63 to the grid of the valve V25 forming the toggle SY. Rectifier MR11 constitutes in effect the gate circuit G16, Fig. 3, which is normally open but can be closed by suitable potential applied to terminal S/S in circumstances which have already been referred to in the general description. The left-hand half of valve V25 is conducting at this time corresponding to the operated condition of the toggle and the effect of the negative pulse is to cause this half to be cut off. In consequence of the interconnections between the grids and anodes usual with a toggle circuit of this type, the right-hand half now becomes conducting. Accordingly a negative pulse is extended from the right-hand anode by way of capacitor C64 and rectifier MR12 to terminal SY to constitute the synchronising pulse. Further pulses via terminal P are ineffective on valve V25 until the toggle SY is again operated, i. e. restored to its original condition.

Pulses from terminal P are also extended however by way of capacitor C65 to the grids of the double triode valve V26 constituting the toggle S2 by way of resistors R61 and R62 and rectifiers MR13 and MR14 and also by way of resistor R63 to the cathodes of this valve. The toggle is initially in the state in which the right-hand portion of the valve is conducting and any changeover is prevented at this stage by the fact that positive potential from the right-hand anode of V25 is fed by way of resistor R64 and rectifier MR15 to suppress the effect of the negative pulse on the right-hand grid. After SY changes over however in response to the first pulse, this inhibiting positive potential is no longer available and the succeeding pulse is effective to reverse S2 so that the left-hand half becomes conducting and a negative pulse is accordingly applied from the right-hand anode to terminal A. The next pulse from P reverses S2 back to its original state and a negative pulse is then applied to terminal B. A negative pulse also extends by way of capacitor C66 and rectifier MR16 to the right-hand grid of valve V25 but this does not reverse the toggle since negative is applied to the left-hand grid from terminal ZA2 over resistor R65 and rectifiers MR17.

The pulse from A extends from terminal A on the right-hand side of Fig. 9 by way of rectifier MR3 and capacitor C51 to the left-hand grid of valve V25 constituting the toggle Z. In the initial position which is considered as the operated position, the left-hand half is conducting and the effect of the pulse from terminal A is therefore to cause it to be cut off whereupon in view of the usual interconnections between the anode and grid circuits the right-hand half becomes conducting. As a result a negative potential is applied to terminal ZA2 and this as just described prevents the toggle SY from being re-operated at this time. The changeover of the Z toggle has the effect of changing over the relays RX and RY in the anode circuits, which accordingly reverse their contacts RX1 and RY1 so that potential is connected to terminals ZX2 and ZY2 for the purpose of controlling the operations of the respective teleprinters.

Pulses applied to terminal A shown on the left-hand side of Fig. 9 are extended by way of capacitor C50 and rectifier MR4 to the cathodes of the valves V21, V22 and V23 forming a six-point cyclic counter of generally known type. In the normal state, the left-hand portions of these valves are conducting and the right-hand portions are cut off and in these circumstances the grid potentials are such that the effect of a suitable negative pulse applied to the cathodes via terminal A will cause valve V23 to change over, that is to say the right-hand portion will conduct and the left-hand portion will be off. On the initial pulse however, this operation is prevented because the low potential of the left-hand anode or valve V24 which is applied to the right-hand grid of V23 by way of resistor R51 and rectifier MR5 prevents this grid from going sufficiently positive. On subsequent pulses however, after the toggle Z has changed over, this effect will no longer be produced and the counter will be moved successively through its various stages. The original changeover of the toggle Z caused a negative pulse to be transmitted to the gates G1 and G7 whence it was extended to the terminals AP and BP to constitute the start signal for each channel.

It should be mentioned that all the gate circuits G1 to G12 are similar to the typical circuit shown in Fig. 12 which will now be referred to. Negative pulses applied to the input terminal I are extended by way of capacitor C91 and resistor R91 and rectifier MR25 to the output terminal O. If however a positive potential is applied to the control terminal C, it is extended by way of resistors R92 and R93, the latter of which is high, and serves to bias the rectifier so that it is non-conducting and thus the input pulse is not transmitted. Capacitor C92 and resistor R94, which are connected in parallel to the junction point of resistors R92 and R93 extend to terminal H and suitable potential applied to this terminal provides a hold or over-riding condition such that the gate is closed regardless of the potential connected to terminal C. The gates G1 and G7 differ from the others of the group in that they have no connection to the control terminal C so that the gate is open unless it is closed by potential on the H terminal, which is connected to the terminals TA and TB respectively. These terminals are arranged to have potential connected to them under the control of the tape contact of the respective tape readers and this potential is removed when a tape is inserted in the reader. These tape contacts also control the other gates over the hold terminals so as to ensure that in no circumstances will the gates be opened if there is no tape in the reader. As regards the punchings in the tape, the effect of a hole is to permit the normal positive potential to remain so that it is applied to the control terminal C of the associated gate and prevents the gate being opened.

Returning now to the operation of the counter, as it moves through its first stage, a pulse is transmitted to gates G2 and G8 from the right-hand anode of V23. At the next stage when the right-hand portion of valve V22 conducts, a pulse is transmitted to gates G3 and G9. At the next stage the right-hand portion of V21 conducts and a pulse goes to gates G4 and G10. At the next stage, valve V23 is again changed over so that the left-hand half conducts and a pulse then goes to gates G5 and G11. In response to the next input pulse, the left-hand portion of valve V22 conducts and a pulse goes to gates G6 and G12. The final pulse, which will restore the counter to its initial state, causes the left-hand portion of valve V21 to conduct and a pulse is then transmitted via resistor R62 capacitor C52 and rectifier MR6 to the right-hand grid of valve V24 whereupon the Z toggle is reversed and positive potential is applied to terminal ZA2.

This means that on the next operation of the toggle S2 to produce a B pulse, the negative pulse applied to the right-hand grid of SY will be effective to re-operate this toggle.

It will be appreciated that the gates are opened under the control of the peckers of the tape readers and thus pulses are applied accordingly to terminals AP and BP whence they are effective in accordance with the appropriate strappings as in Fig. 4.

It has already been explained how the operation of the toggle S2 directs the incoming pulses at 100 P. P. S. to the A and B channels alternately so that 50 P. P .S. are applied to each channel, or in other words the interval between pulses is 20 ms. The A pulses extend by way of capacitor C69 and rectifiers MR18 and capacitor C67 to terminal AL but only if this gate G18 is opened by the application of positive to terminal IC from the incoming line relay whence it is effective by way of resistors R66 and R67. Similarly, B pulses are extended by way of capacitor C68, rectifiers MR19 and capacitor C70 to terminal BL but only if at this instant gate G19 is opened by positive extended from terminal IC by way of resistors R68 and R69.

The various possibilities of operation of the sequence unit have already been described in connection with Figs. 3 and 4 and it is only necessary to point out briefly the detailed operation of the electronic relays L and T shown in Fig. 11. The electronic relay L is constituted by the double triode valve V27 having its anodes and grids interconnected to form a toggle circuit in known manner and having an electromagnetic relay RL in its anode circuits. This relay controls the contacts RL1 by means of which suitable signals are sent to line or extended to effect the operation of the teleprinter of channel B. As will be appreciated, the normal condition of the valve V27 is that the left-hand half is conducting in which case the relay contacts RL1 are in the position shown. The toggle may be reversed by the application of a negative pulse to terminal L whence it is extended to the left-hand grid and causes the toggle to change over. Operation in the other direction is effected by a negative pulse applied to terminal LR whence it is extended over rectifier MR21 to the right-hand grid of valve V27 and causes the reverse operation.

The electronic relay T is constituted by the double triode valve V28 having the usual grid and anode interconnections to give known toggle operation and having the electromagnetic relay RT in its anode circuits. This relay controls the contacts RT1 by means of which the operation of the teleprinter of the A channel is effected. The left-hand half of valve V28 is normally conducting and reversal of the toggle is effected by the operation of a negative pulse to terminal T whence it is extended to the left-hand grid. The reverse or re-set operation is produced by the application of a negative pulse to terminal TR whence it is extended over rectifier MR22 to the right-hand grid. The circuit of valve V28 differs from that of valve V27 however in that a connection extends from the left-hand anode by way of capacitor C71, rectifier MR23 and resistor R71 to terminal TP. As pointed out in connection with Fig. 4, for some uses of the sequence unit, terminal TP is connected to terminal L and in these circumstances on the restoration of the toggle T, that is to say when the left-hand portion of valve V28 again becomes conducting, a negative pulse is extended to the toggle L to cause it to move to its operated position.

The purpose of terminal S/S has already been referred to, viz. for use in connection with start-stop working or for lining up purposes and no further description will therefore be given.

I claim:
1. In a multi-channel synchronous telegraph system, a transmitting station, a signalling line extending from said station, a plurality of transmitters at said station, a pulse source located at said station, means in said transmitters for generating simultaneously signals in the form of pulses in synchronism with pulses from said source and converting means for causing said signals to be connected to line successively at intervals equal to the line time per signal element assigned to each transmitter.

2. In a multi-channel synchronous telegraph system, a signalling line, a plurality of transmitters, a source of pulses common to said transmitters, control means in said transmitters for selectively connecting up said pulse source in accordance with signals to be transmitted, a plurality of toggle circuits each individual to one of said transmitters and arranged to be operated by pulses from its associated transmitter, means for applying re-setting pulses to said toggle circuits at intervals equal to the line time per signal element for each channel, circuit connections whereby each toggle circuit except the last on restoration to normal effects the operation of the next toggle circuit in succession and circuit connections whereby the last toggle circuit on operation transmits signals over said line.

3. In a synchronous multi-channel telegraph system according to claim 2, circuit arrangements for ensuring that said re-setting pulses are of shorter duration and smaller amplitude than said operating pulses whereby if both types of pulses are supplied to a toggle circuit simultaneously, the operating pulses are effective to produce or maintain the operated condition of said toggle circuit while if re-setting pulses alone are received they are effective to produce or maintain the normal condition of said toggle circuit.

4. In a two-channel synchronous telegraph system, a transmitting station, a signalling line extending from said station, two tape readers at said station associated respectively with the two channels, a pulse source located at said station and arranged to produce pulses at intervals equal to half the signal element length, a six-stage cyclic counter, means for distributing impulses from said source in a cycle whereby the first impulse is suppressed and thereafter alternate impulses are transmitted to said counter, means for obtaining impulses from all stages of said counter except the last, two series of six gate circuits controlled respectively by said tape readers, a first toggle circuit, means for transmitting impulses from the different stages of said counter respectively through the gate circuits of said first series to said first toggle circuit, means controlled by the operation of said first toggle circuit for transmitting impulses to said line, a second toggle circuit, means for transmitting impulses from the different stages of said counter respectively through the gate circuits of said second series to said second toggle circuit, connections between said toggle circuits whereby the resetting of said second toggle circuit effects the operation of said first toggle circuit and means for applying pulses from said local source to both said toggle circuits to effect resetting.

5. In a two-channel synchronous telegraph system, a station, a first signalling line terminating in said station, a second signalling line extending from said station, two tape readers at said station associated respectively with said two channels, receiving equipment at said station, a pulse source located at said station and arranged to produce pulses at intervals equal to half the signal element length, a six-stage cyclic counter, means for distributing impulses from said source in a cycle whereby the first impulse is suppressed and thereafter alternate impulses are transmitted to said counter, means for obtaining impulses from all stages of said counter except the last, two series of six gate circuits controlled respectively by said tape readers, a first terminal, means for transmitting impulses from the different stages of said counter respectively through the gate circuits of said first series to said first terminal, a second terminal, means for transmitting impulses from the different stages of said counter respectively through the gate circuits of said second series to said second terminal, a pair of gate circuits associated respectively with the two channels and controlled by signals incoming over said first line, a third terminal, a fourth terminal, means for distributing pulses from said local source through said pair of gate circuits respectively to said third and fourth terminals, a first toggle circuit, means for operating said first toggle circuit, means for resetting said first toggle circuit, a second toggle circuit, means for operating said second toggle circuit, means for resetting said second toggle circuit, means controlled by said first toggle circuit on operation for operating said receiving equipment and for transmitting signals over said second line and switching means for selectively associating said toggle circuits with said first and second terminals or with said third and fourth terminals according as signals are to be transmitted over said second line from said tape readers or are to be received over said first line to operate said receiving equipment.

6. In a two-channel synchronous telegraph system, a first signalling line, a receiving station terminating said line, receiving equipment at said station, a pulse source located at said station and arranged to generate pulses at a repetition frequency equal to half the length of a signal code element, means in said receiving equipment responsive to signals in the form of pulses incoming over said first line for altering the speed of operation of said pulse source so as to eliminate any phase difference between the locally generated pulses and the incoming pulse signals, a pair of gate circuits associated respectively with the two channels and controlled by incoming signals, means for distributing the local pulses through said gate circuits, a toggle circuit, means for operating said toggle circuit by pulses passing through either of said gate circuits, means for resetting said toggle circuit by pulses from said local source, a second signalling line outgoing from said receiving station and means controlled by the operation of said toggle circuit for transmitting pulses over said outgoing line.

7. In a synchronous telegraph system, a signalling line, a receiving station terminating said line, an oscillator located at said receiving station, a multi-vibrator arranged to have two different values for its operating period, means for supplying pulses from said oscillator to said multi-vibrator, circuit components such that a plurality of pulses from said oscillator are needed to produce operation of said multi-vibrator, receiving equipment responsive to signals incoming over said line, and means operative from said receiving equipment for altering from one integral value to another the number of pulses from said oscillator which are needed to produce operation of said multi-vibrator.

8. In a synchronous telegraph system, a signalling line, a receiving station terminating said line, an oscillator located at said receiving station, a multi-vibrator arranged to have two different values for its operating period, means for supplying pulses from said oscillator to said multi-vibrator, circuit components such that a plurality of pulses from said oscillator are needed to produce operation of said multi-vibrator, receiving equipment responsive to signals in the form of pulses incoming over said line, correcting equipment controlled by said receiving equipment and means operative from said correcting equipment for altering from one integral value to another the number of pulses from said oscillator needed to produce operation of said multi-vibrator so as to eliminate any phase difference between the locally generated pulses and the incoming pulse signals.

9. In a synchronous telegraph system according to claim 7, a plurality of binary stages of frequency division connected in cascade, means for supplying pulses from said multi-vibrator to the first of said frequency dividing stages and means for supplying pulses from the last of said stages to said receiving equipment.

10. In a synchronous telegraph system according to claim 7, a first stabilized direct current source of one predetermined voltage, a second stabilized direct-current source of a different predetermined voltage and means for applying one or other of said sources to the grid charging resistors of said multi-vibrator so as to vary its time period.

11. In a synchronous telegraph system according to claim 10, a double triode having each portion connected as a cathode follower, means for applying pulses to the grids of said double triode to control the conduction of the electron path, a pair of double diodes connected respectively to the cathodes of said double triode and circuit connections between said double diodes and said multi-vibrator whereby the potentials supplied to said multi-vibrator by way of said double diodes are stabilised.

12. In a synchronous telegraph system according to claim 7, means for operating said multi-vibrator from one stable position to the other in response to an integral number of pulses from said oscillator, means for restoring said multi-vibrator to its original stable position in response to a different integral number of pulses from said oscillator, means for reducing the time period of said multi-vibrator by arranging for both operations to take place in response to the smaller number of pulses and means for increasing the time period of said multi-vibrator by arranging for both operations to take place in response to the greater number of pulses.

13. In a synchronous telegram system according to claim 8, the arrangement whereby the change in the number of pulses required to operate said multi-vibrator represents a 20% increase or decrease in the speed of operation and control means for applying the correction for a period five times as long as the actual phase difference between the locally generated pulses and the incoming pulse signals so that complete correction is obtained.

14. In a synchronous telegraph system according to claim 8, means for deriving pulses from the change of sign of incoming signals, means for producing two voltage waves of complementary saw-tooth formation controlled from the local pulse source, means for applying said derived pulses to said voltage waves to obtain voltage pulses of opposite sign and of amplitude proportional to the phase difference, a second multi-vibrator, a third multi-vibrator, means for applying said voltage pulses of opposite sign to said second and third multi-vibrators respectively to obtain correcting pulses of duration proportional to the amplitude of said voltage pulses and means controlled by said correcting pulses for causing the period of operation of said first multi-vibrator to be shortened or lengthened respectively for the duration of said correcting pulses.

References Cited in the file of this patent

UNITED STATES PATENTS

| | | |
|---|---|---|
| 2,365,450 | Bliss | Dec. 19, 1944 |
| 2,520,953 | Norris et al. | Sept. 5, 1950 |
| 2,609,452 | Hansen | Sept. 2, 1952 |
| 2,611,034 | Brewer | Sept. 16, 1952 |